Nov. 13, 1956  R. K. GALLOWAY  2,770,404
FILLING VALVE
Filed Dec. 1, 1952  4 Sheets-Sheet 1
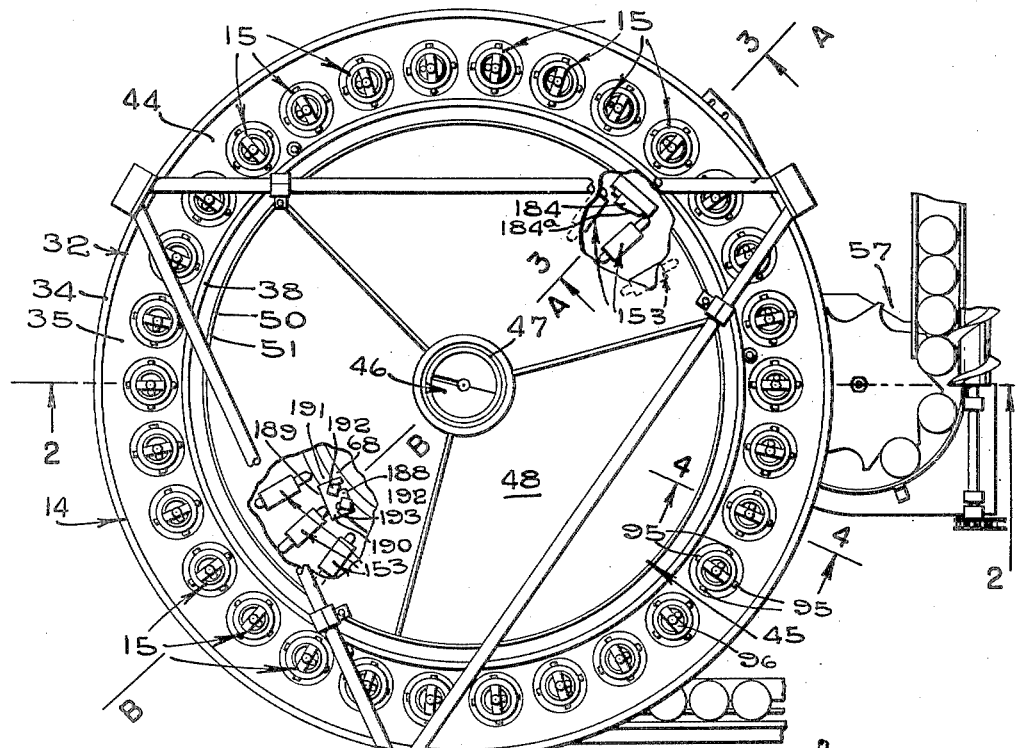
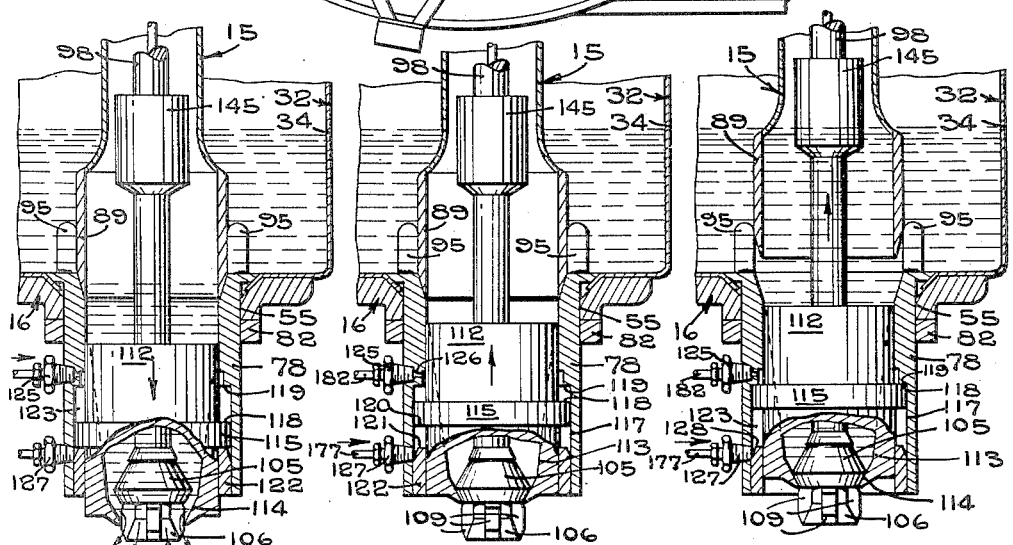
INVENTOR
ROBERT K. GALLOWAY
BY Hans G. Hoffmeister
ATTORNEY

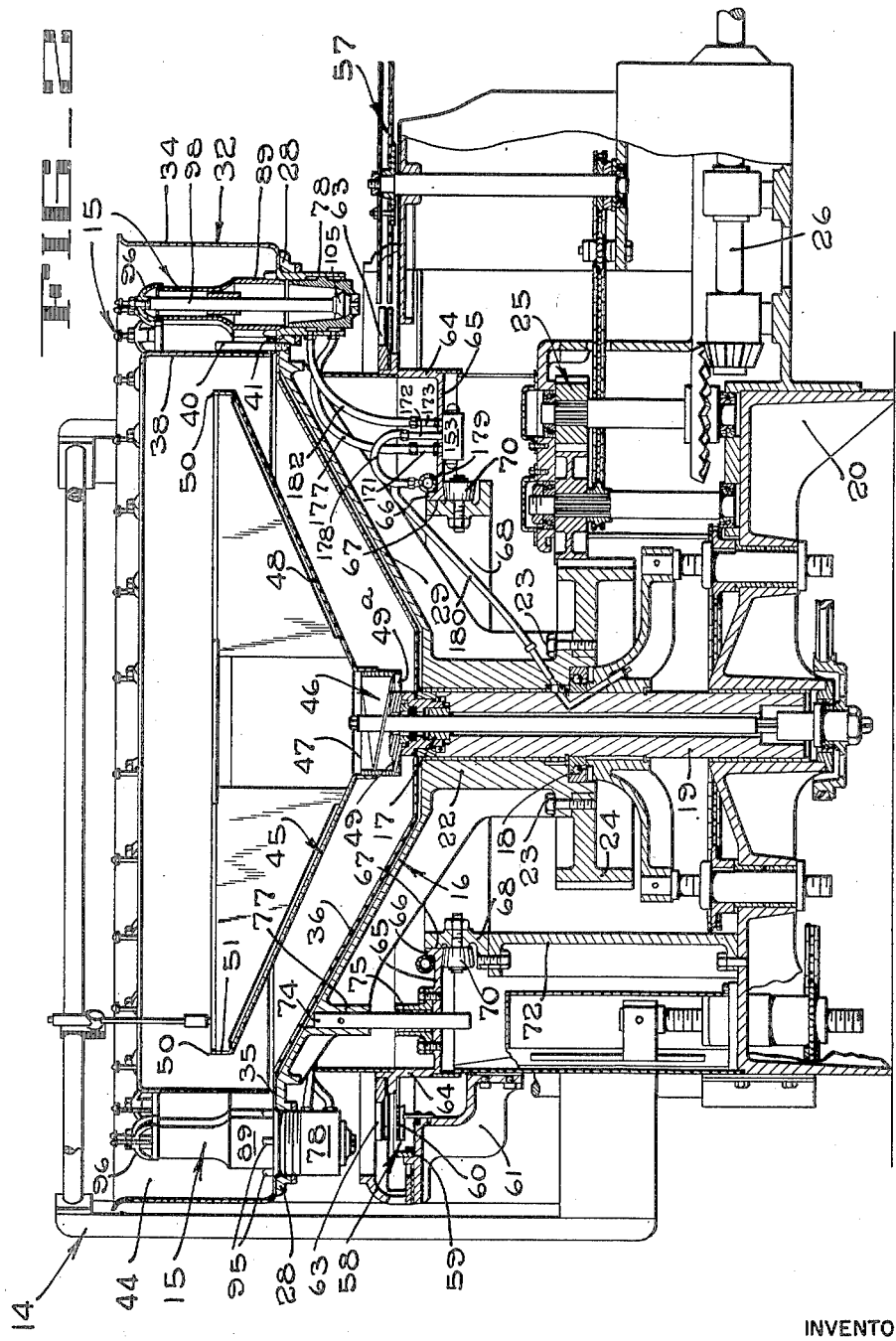

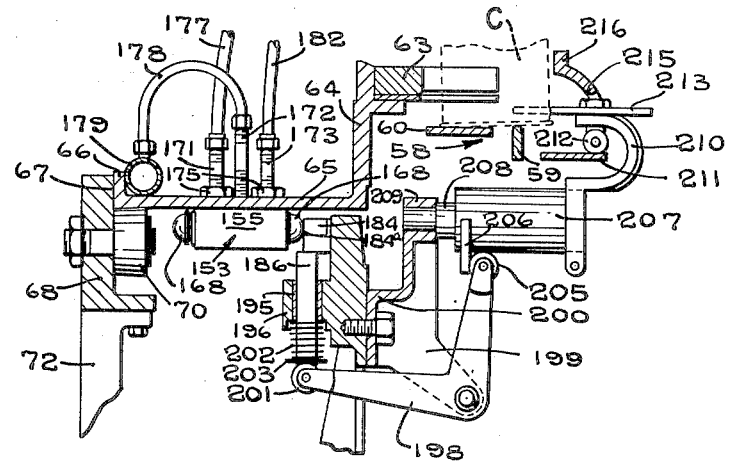
FIG_3
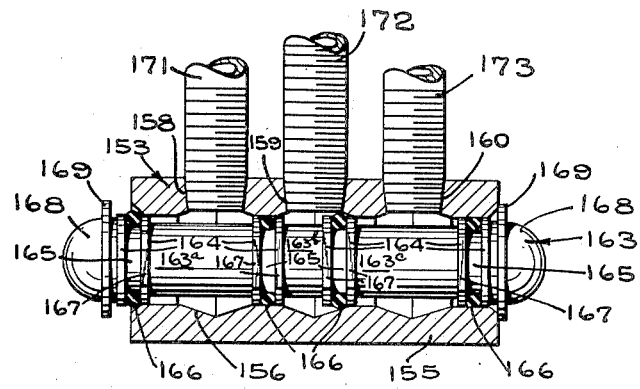
FIG_8

Nov. 13, 1956 R. K. GALLOWAY 2,770,404
FILLING VALVE
Filed Dec. 1, 1952 4 Sheets-Sheet 4
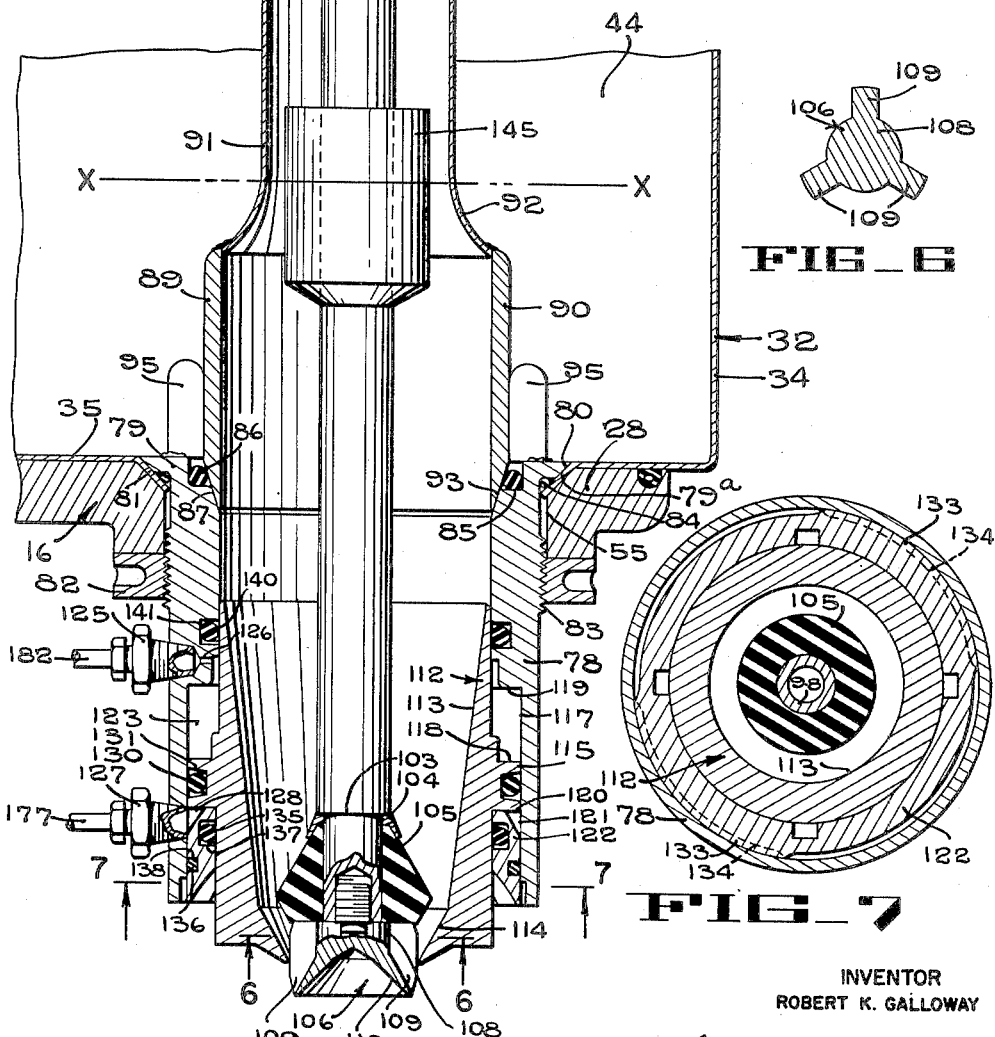
INVENTOR
ROBERT K. GALLOWAY
BY Hans G. Hoffmeister.
ATTORNEY United States Patent Office 2,770,404
Patented Nov. 13, 1956

2,770,404
FILLING VALVE

Robert K. Galloway, Hoopeston, Ill., assignor to Food Machinery and Chemical Corporation, San Jose, Calif., a corporation of Delaware Application December 1, 1952, Serial No. 323,406

2 Claims. (Cl. 222—448)

This invention appertains to improvements in machines for filling containers with fluid. More particularly it relates to an improved measuring and filling valve for a filling machine.

In the food canning industry, machines for filling containers are employed in which liquid is pumped from a central chamber and dispensed through filling valves into cans or like containers, the arrangement being such that each valve automatically encloses or traps a measured quantity of liquid which it later discharges into one of a consecutive line of cans. In such a machine a plurality of cans are successively admitted, are filled as they are advanced through the machine, and are automatically discharged after they are filled.

It is an object of the present invention to provide a valve for a can filling machine adapted to accurately measure a desired quantity of liquid and deliver the measured charge to a can as the can is progressively moved through the machine.

Another object is to provide a metering type filling valve having means for varying the capacity of the valve.

Another object is to provide an efficient actuating mechanism for a metering valve.

Another object is to provide a metering valve that is simple in construction and which may be readily disassembled for cleaning.

Another object of this invention is to provide, in a filling machine, means for insuring that all valves meter and discharge identical quantities of liquid.

Other and further objects and advantages of the present invention will become apparent from the following detailed description taken in connection with the accompanying drawings, in which:

Fig. 1 is a plan view, partly broken away to more clearly disclose the internal structure of a filling machine incorporating filling valves, and a control system therefor, constructed in accordance with the teachings of the present invention.

Fig. 2 is a vertical section taken along line 2—2 of Fig. 1.

Fig. 3 is a vertical section taken along line 3—3 of Fig. 1.

Fig. 4 is a vertical section taken along line 4—4 of Fig. 1 through the vertical centerline of a novel metering and filling valve of the present invention.

Fig. 5 is a vertical section taken along line 5—5 of Fig. 4.

Fig. 6 is a fragmentary horizontal section taken along line 6—6 of Fig. 4.

Fig. 7 is a horizontal section taken along line 7—7 of Fig. 4.

Fig. 8 is a section taken centrally through an air control unit of the present invention.

Figs. 9, 10 and 11 are fragmentary sections partly broken away, of a portion of the filling machine and particularly illustrating progressive movements of the novel valve structure during the filling operation.

In Figs. 1 and 2 the reference numeral 14 indicates generally a rotary filling machine in which a plurality of novel filling valves 15 of the present invention are operatively disposed. Since the operation of the filling valves is dependent upon the functioning of the other parts of the filling machine to maintain a desired liquid level in the supply tank and since the opening and closing of the valves are coordinated with the operations of the filling machine, it will be advantageous to first describe the operation of the filling machine in general before describing the operation of the valves 15.

The filling machine 14 comprises a turret 16 which is rotatably mounted by a bushing 17 and a bearing assembly 18 on a stationary support 19 extending upwardly from a rigid base structure 20. The turret 16 has a hub 22 secured by a plurality of capscrews 23 to the flange of a gear 24 which is driven through a suitable transmission 25 from a power driven shaft 26. The turret 16 has an outer, annular flat supporting platform 28 connected to the hub 22 by a generally conical, rigid, drive transmitting section 29. Supported on the turret 16 for rotation therewith is an outer tank 32 formed by a continuous, rigid sheet metal member including an upright cylindrical wall 34, an annular tank bottom 35 and a tank liner portion 36. A cylindrical baffle 38 is supported in upright position in spaced relation above the tank bottom 35 by a plurality of studs 40 (Fig. 2) that are threaded, at one end, into the tank bottom 35 and into the supporting platform 28 of the turret and, at the other end, are secured, as by setscrews (not shown) to collars 41 welded to the side surface of the baffle. The space between the tank wall 34 and the baffle 38 defines an annular trough 44 into which liquid is pumped from an inner, stationary, generally conical tank 45 by a power driven pump 46. The pump 46 draws liquid from the inner tank 45 through an opening 47 in the slanted bottom wall 48, forces it downwardly through openings 49a in a stationary plate 49 secured to the support post 19 and then upwardly along the tank liner 36, under the baffle 38 and into the trough 44. When the level of the liquid reaches the upper edge 50 of the side wall 51 of the inner tank 45, it spills over the baffle and is returned to the inner tank 45. The pump 46 has sufficient capacity to keep the trough overflowing at all times and thus the elevation of the upper edge 50 of the inner tank wall 51 will determine the level of liquid in the trough 44, which level determines the height to which each valve is filled.

The metering and filling valves 15 are disposed in upright position in the trough 44, each valve being positioned in an opening 55 (Fig. 4) in the tank bottom 28 in a manner to be described hereinafter.

Referring to Fig. 2, it will be seen that a can feeding mechanism 57, of the well known star wheel type, delivers cans to a can track 58 which is mounted immediately below the trough. It will be understood that the drive mechanism for the turret and the drive mechanism for the can feeding apparatus may be of any standard type which is arranged so that the feeding of the cans may be synchronized with the movement of the valves on the turret to position a can directly under each valve. The can track 58 comprises an upright track 59 and a flat, adjustable plate 60 supported on a plurality of brackets 61 secured to a rigid casing of the machine. This can track is fully disclosed and claimed in my copending application for patent entitled Tank Construction for a Filling Machine, now Patent No. 2,710,024. The cans are moved along the can track by a plurality of moving arms 63 (Fig. 2) which embrace each can individually and urge it along the track. The arms 63 are mounted on an upstanding rim 64 of a rotatable, annular platform 65 which has an inner, generally cylindrical surface 66 disposed in guided, relatively rotatable relation around an outer guide surface 67 of a rigid support ring 68. The ring 68, which carries a plurality of rollers 70 on which the platform 65 is supported, is secured in fixed stationary position relative to the base 20 by a plurality of structural members 72 which are bolted to the base and to the support ring 68. The platform 65 is driven by means of a pin 74 which is rotatably journalled near one end in a boss 75 of the platform and is keyed at the other end in a collar 77 integrally formed in a depending position on the conical section 29 of the turret 16. Thus, as the turret rotates to carry the trough 44 and the valves 15 in a circular path, it also moves the cans along a similar circular path at the same speed by means of the arms 63 carried on the platform 65.

Referring to Fig. 4, it will be seen that each valve 15 comprises a stationary cylindrical housing 78 secured in an opening 55 in the tank supporting platform 28. The housing 78 has an annular flange 79 at its upper end, with an outer beveled peripheral surface 79a seated in a tapered annular seat 80 defined by a downwardly inclined portion 81 of the tank bottom 35 and by a beveled counterbore in the platform 28 around the upper end of the opening 55. A nut 82, engaged over a threaded portion 83 on the outer surface of the housing 78, locks the valve housing in position. A seal ring 84 is disposed in compressed engagement between the flange 79 and the inclined portion 81 of the trough bottom to insure positive sealing against leakage from the tank. The upper edge of the opening in the housing 78 is counterbored, as at 85, to provide a seat for a seal ring 86. Seated within the seal ring 86 and extending into a beveled bore 87 in the housing 78 is an upper movable valve body 89 comprising a generally cylindrical lower portion 90 and an upper tubular portion 91 having a flared section 92 welded to the lower cylindrical portion. The lower body portion 90 has a frusto-conical end surface 93 adapted to engage the beveled bore 87 of the housing and the seal ring 86 in liquid-tight engagement. Four spaced upstanding lugs 95, secured to the upper end of the housing 78, hold the slidable upper valve body in vertical alignment. A bridge 96 is secured across the upper, open end of the valve body 89 to provide a support for an elongated valve stem 98 which has a reduced diameter upper end portion 99 extending through an opening 100 in the bridge. The valve stem is suspended from the bridge by a capscrew 101 which is threaded into a tapped opening in the end of the stem, the head of the capscrew being disposed in overlapping engagement with the ledge 102 formed on the bridge 96 around the opening 100 therein.

The lower end of the valve stem is reduced in diameter to form a shoulder 103 against which a rigid, cupshaped retainer 104 is positioned. A rubber valve head 105 is tightly clamped against the retainer by means of a special capscrew 106 that has a shank portion threaded into a tapped opening in the lower end of the valve stem and an enlarged cylindrical body portion 108 that abuts the lower end of the rubber valve head to force the valve head against the retainer 104. A plurality of laterally-extending angularly spaced fins 109 (Fig. 6) are formed on the body 108 to define liquid flow passages between the fins. The lower ends of the fins are joined by a skirt 110 which depends from the body portion and has a downwardly and outwardly sloped outer surface for directing liquid toward the inside walls of the can therebelow.

A generally cylindrical hollow lower valve body 112 is disposed for slidable vertical movement in the housing 78 to provide a closure member for the lower end of the housing. This lower valve body 112 has an inner, downwardly converging, surface 113 which terminates at its lower end in a conical valve seat 114. The lower valve body 112 also has an annular flange 115 projecting outwardly from its outer side wall into close sliding engagement with an enlarged diameter bore 117 of the housing 78. Upward movement of the lower valve body 112 is limited by the abutment of the upper surface 118 of the flange 115 with a shoulder 119 formed in the housing by the enlarged diameter bore 117. Downward movement of the lower valve body is limited by the contact of the lower surface 120 of the flange 115 with an upper surface 121 of a retainer ring 122. Thus, an annular chamber 123 is defined between the inner wall of the housing 78, the outer wall of the lower valve body 112, the shoulder 119, and the flange 115. Air under pressure may be directed to the chamber 123 above the flange 115 by means of a fitting 125 which is connected, as will be explained presently, to a suitable source of air under pressure and arranged to direct air to an annular passage 126 formed by an undercut in the housing. A fitting 127 is arranged to deliver air from a source of pressurized air to an annular recess 128 in the housing which communicates with the chamber 123 below the flange 115 of the lower valve body 112. A resilient seal ring 130 is disposed in a groove 131 in the flange 115 in air-tight engagement between the walls of the groove 131 and the inner wall of the housing. It will therefore be recognized that the upper and lower annular surfaces of the flange 115 act as pistons causing the lower valve body 112 to be raised when air is introduced into the chamber 123 through the fitting 127, and causing the lower valve body 112 to be lowered when air is introduced through the fitting 125.

The retainer ring 122 is held in close fitting engagement in the lower end of the housing 78 by means of a bayonet-type connection formed by two diametrically-opposed flanges 133, Fig. 7, which extend radially outwardly from the ring 122 and project into grooves 134 formed in the inner surface of the housing 78. Seal rings 135 and 136, disposed in grooves 137 and 138, respectively, in the retainer 122, prevent the passage of air downwardly past the retainer 122, while a seal ring 140 disposed in a groove 141 in the inner wall of the housing 78 prevents the passage of air upwardly between the housing and the lower valve body.

It is, of course, necessary that each valve 15 measures out the same quantity of liquid as every other valve. As will be explained more fully in connection with the overall operation of the valve, the quantity of liquid that each valve meters is dependent upon the level of the liquid in the trough 44. It will be appreciated that, since the trough 44 is constantly rotating with the turret and, since liquid is intermittently drawn from the trough into the chamber of an open valve when the upper valve body 89 is lifted off the seat 87, a degree of turbulence is created in the trough which causes fluctuations in the liquid level. To minimize the variations in the amount of liquid trapped due to fluctuations in the liquid level, the diameter of the upper valve body 89 is reduced in diameter, as seen in Fig. 4. Thus, the cross-sectional area of the internal chamber of the valve body is very small at the level corresponding to the liquid level maintained in the trough by the pump 47. This liquid level is indicated in Fig. 4 by the reference line "X." A further reduction in the cross-sectional area of the chamber at the critical liquid level is attained by a displacement plug 145 (Fig. 4) which is generally cylindrical in shape and has a central longitudinal opening through which the valve stem 98 extends in sliding relation. With this displacement plug in place, the area of the chamber at the critical level is limited to the annular space between the plug and the wall of the upper valve body 89. The displacement plug 145 may be adjusted in the chamber by means of a rod 146 (Fig. 5) to the lower end of which the plug is suitably secured. A stud 147 is loosely disposed in a lateral opening 148 near the upper end of the valve stem 98. The stud is threaded at one end to receive a nut 149, while the other end is provided with a hole 150 through which the rod 146 extends. Tightening of the nut 149 will draw the rod 146 against a grooved washer 151 disposed on the stud to clamp the rod in any adjusted position.

In Figs. 9, 10 and 11, the various positions of the valve during the operation of the filling machine are illustrated. The air control system by which air is directed either to the fitting 125 or the fitting 127 is not shown in Figs. 9, 10 and 11 but will be described presently. In Fig. 9, the valve is shown in the discharge position. Air has been directed to the chamber 123 above the annular flange or piston 115 driving the lower valve body downwardly against the retainer ring 122. In this downward movement the valve seating surface 93 of the upper valve body 89 first comes to rest on the seat 87 of the valve housing 78, trapping a quantity of liquid inside the valve. Since the valve stem 98 is carried by the upper valve body, its downward movement is also arrested, and further descent of the lower valve body 112 under the influence of pressurized air above the piston 115 causes the unseating of the flexible valve head 105 and the discharge of liquid into the can therebelow. After the liquid has been completely discharged from the valve, air is directed to the fitting 127 to introduce air to the lower side of the piston 115 causing the upward movement of the lower valve body 112. As the lower valve body moves upwardly, it seats the rubber valve head 105 as shown in Fig. 10, and then unseats the valve seating surface 93 of the upper valve body as shown in Fig. 11. The liquid in the trough 44 then rushes in to fill the valve so that when the valve seating surface 93 of the upper valve body 89 is returned to engagement with the seat 87 in the valve housing, as shown in Fig. 9, it will trap a charge of liquid inside the valve. In summary, when air is directed to the upper fitting 125, the filling and metering valve 15 is moved to a discharge position shown in Fig. 9. When air is directed to the fitting 127, the valve is moved to the valve filling position shown in Fig. 11.

Referring to Figs. 2 and 3, it will be seen that the flow of air under pressure to fittings 125 and 127 is controlled by air control units 153 and that a separate air control unit 153 is provided for each valve. Each air control unit (Fig. 8) comprises a housing 155 secured to the underside of the platform 65 (Fig. 1) which is rotated by the turret 16. The housing 155 has a central cylindrical bore 156 (Fig. 8) and tapped openings 158, 159 and 160 extending through the wall of the housing into communication with the central bore 156. A rod 163 is disposed in the bore 156 having a plurality of large diameter cylindrical portions 164 in slidable contact with the interior wall of said bore. Grooves 165, formed in said cylindrical portions, receive resilient rings 166 which sealingly engage the rod and the wall. Reduced diameter portions 163a, 163b and 163c are formed on the rod between adjacent cylindrical surfaces and flats 167 are provided on the large diameter portions 164 to form annular air passages around the rods and communicating with the tapped openings 158, 159 and 160, respectively. A button 168 is formed on each end of the rod, and snap rings 169 are disposed in grooves at the ends of the rod to form retaining shoulders. Nipples 171, 172 and 173, are threaded into the tapped openings 158, 159 and 160, respectively, and extend through openings (Fig. 3) in the frame so that nuts 175 screwed on the outside of the nipples 171 and 173 serve to secure the housing 155 to the platform 65. The nipple 171 is connected to a conduit 177 leading to the fitting 127 that directs air to the chamber 123 below the annular piston 115 of the lower valve body. The nipple 172 is connected to a conduit 178 leading to a circular header 179 that is carried by the platform 65 and supplied with air under pressure from a supply conduit 180 (Fig. 2). The nipple 173 is connected to a conduit 182 leading to the fitting 125 that directs pressurized air to the chamber 123 above the annular piston 115 of the lower valve body 112.

The rod 163 of each air control unit 153 is actuated by a cam 184 (Figs. 1 and 3) which is mounted on the upper end of a vertically movable rod 186, for a purpose to be explained presently. The cam 184, which is located at the valve discharge station A—A (Fig. 1) has a fixed camming surface 184a inclined inwardly toward the axis of the turret. Thus, with the turret rotating in a counterclockwise direction, as seen in Fig. 1, the rod 163 of each air control unit will be pushed inwardly when the button 168 of the rod contacts the inclined surface 184a of the cam. As seen in Fig. 8, inward movement, or movement to the left, will communicate the air inlet nipple 172 with the nipple 173 leading to the fitting 125 which is connected to the upper end of the chamber 123 in the valve 15, and will vent the conduit 171 to atmosphere. Thus, at position A—A each metering and filling valve 15 is moved to discharge position.

The valve is held in discharge position for substantially 180° of turret rotation at the end of which the knob at the opposite end of the rod 163 in the air control unit 153 is contacted by a cam 188 (Fig. 1) located at position B—B of the machine. The cam 188 has an inclined camming surface 189 formed by one edge of the cam body 190 which is adjustably secured to a bracket 191 mounted on the stationary support ring 68. Adjustment of the cam relative to the bracket for varying the cam angle is accomplished by capscrews 192 which pass through slots 193 in the cam body and are threadedly engaged in the bracket. When the button 168 of the rod contacts the cam 188, the rod is shifted outwardly, or to the right in Fig. 8, communicating the air inlet nipple 172 with the nipple 171 leading to the fitting 127 which directs air to the lower end of the chamber 123 and venting the conduit 173 to atmosphere. Thus, at position B—B the discharge port of the valve is closed, and the filling of the valve is begun and continued until the valve arrives at the discharge position A.

If for any reason no can is moved onto the can track below a particular valve, that valve will not be opened at the discharge position A. This advantageous arrangement is obtained by mounting the cam 184 (Fig. 3) at the discharge position A—A on the vertically movable rod 186. The plunger 186 is slidably movable in a bushing 195 in a ledge 196 formed on the inner surface of the casing of the filling machine. A bellcrank 198, pivotally mounted on a flange 199 of a bracket 200, carries a roller 201 which bears against the lower end of the plunger 186. A compression spring 202, disposed on the lower end of the plunger between the ledge 196 and a shoulder 203 formed on the plunger, maintains a constant contact between the lower end of the plunger 186 and the roller 201, and tends to turn the bellcrank 198 counter-clockwise thereby pressing a roller 205, carried on the other arm of the bellcrank, against a depending ear 206 on a sleeve 207. The sleeve is slidably supported on a stud 208 which is rigidly supported by a collar 209 on the bracket 200. A roller bearing (not shown) is inserted within the sleeve to minimize sliding friction. The sleeve 207 carries an actuating bracket 210 which is tightly clamped thereon. The bracket 210 is also supported on a horizontal flange 211 by a roller 212. A can detector plate 213, rigidly secured on the upper surface of the bracket 210, extends through an opening 215 in the guide rail 216 and into the path of the cans C as they are moved along the can track 58. When the plate is contacted by a can C, it is moved radially outwardly, relative to the filling machine axis, as from the dotted line position to the full line position in Fig. 3. This outward movement of the plate 213 carries the sleeve 207 outwardly and causes the depending ear 206 on the sleeve to pivot the bellcrank 198 clockwise about its pivot axis. As a result, the rolller 201 pushes the rod 186 upwardly and moves the cam 184 into the position wherein it will be contacted by the button end 168 of the air control unit.

In Fig. 3 the coordination of the detector plate 213 with a particular can C on the can track, the cam 184 at the discharge station A, and a particular air control unit 153 associated with the can C is illustrated. It is to be noted that the can C has moved the detector plate 213 radially outwardly, and that this outward movement has raised the cam 184 into the path of travel of the button 168 on the air control unit 153 which, of course, is being moved in timed relation with the can C and the filling valve 15 mounted directly above the can. It will be evident that, if for any reason a can is not positioned under one of the filling valves, the detector plate will not be moved outwardly when that filling valve arrives at the discharge station A—A. Consequently, the cam 184 will not be moved into the path of the button on the end of the air control unit associated with the valve and, accordingly, the valve will not be opened to discharge its contents.

Summarizing the operation of the novel metering and filling valve of this invention, cans are moved onto the can track 58 by the star feeding mechanism 57 so that a can is positioned under each metering and filling valve 15. It will be understood that each valve 15, as it approaches the can feeding mechanism 57, is in the valve filling position shown in Fig. 11. As each can C, its associated valve 15, and the associated air control unit 153 approach the valve discharge position A—A, the can moves the detector plate 213 outwardly to effect raising of the cam 184 into the position wherein the button 168 of the air control unit will contact the cam and move the rod 163 connected to the button radially inwardly into the housing 155 of the unit 153. The inward movement of the rod causes air under pressure to be directed to the upper fitting 125 of the valve and into the chamber 123 at a point above the annular piston 115, moving the lower valve body 112 downwardly and permitting the seating surface 93 of the upper valve body 89 to sealingly engage the seat 87 of the valve housing 78 to trap a charge of liquid into the valve. Further downward movement of the lower valve body moves the valve seat 114 away from the rubber valve member 105, as seen in Fig. 9, and causes the charge of liquid to be discharged into the can therebelow. When the valve reaches the valve filling position B—B (Fig. 1), the button 168 on the radially inner end of the rod 163 of the air control unit is contacted by the fixed cam 188 which shifts the rod outwardly to vent the air line to the fitting 125 and communicates the source of pressurized air with the conduit 177 leading to the fitting 127. Thus, at position B—B, air under pressure enters the chamber 123 of the valve and moves the lower valve body 112 upwardly to engage the rubber valve member 105 (Fig. 10) and move the valve stem 98 bodily upwardly to lift the sealing member 93 of the upper valve body 89 away from the valve seat 87 to the position of Fig. 11. When the valve seat 87 is opened, liquid in the annular supply trough 44 rushes into the valve to fill it to a level corresponding to the level of the liquid in the supply trough, thus providing a charge of liquid in the valve which will be later trapped therein by the descent of the upper valve body at the valve discharge position A—A.

It will now be apparent that there is provided in the present invention a plurality of novel, efficient, metering and filling valves which are arranged to meter substantially identical quantities of liquid, and discharge the metered quantities into containers in timed relation with the movement of the containers through the filling machine. Referring to Fig. 4, it is to be particularly noted that the upper valve body 91 may be removed from the valve assembly merely by lifting it upwardly from its position inside the lugs 95. The capacity of each valve may be changed by substituting an upper valve body having a different internal volume below the liquid level line. The dimension of the seating surface 93 must, of course, be identical for all replacement upper valve bodies. The ease of removal of the upper valve body 91 also greatly simplifies the problem of cleaning the valves and the associated filling machine parts.

It will be understood that modifications and variations may be made without departing from the scope of the present invention.

Having thus described my invention, what I claim as new and desire to protect by Letters Patent is:

1. A liquid dispenser comprising a housing having a chamber open at both ends, one open end forming an inlet port for liquids, a first valve seat disposed around said inlet port, a first valve adapted to sealingly engage said first valve seat in liquid-tight engagement, a cup-shaped member having a side wall engaging the inner wall of said housing in liquid-tight slidable engagement, the hollow interior of said cup-shaped member combining with said chamber to form a liquid reservoir receiving liquid through said inlet port, means for filling said reservoir with liquid when said inlet port is open, the bottom wall of said cup-shaped member having an opening providing a discharge port for said reservoir, a second valve seat formed in the bottom wall of said cup-shaped member around said discharge port, a second valve connected to said first valve for conjoint movement and arranged to engage said second valve seat in liquid-tight engagement, and said cup-shaped member being movable in said housing in one direction for consecutively moving said second valve seat into engagement with said second valve and moving said first valve away from said first valve seat permitting liquid to enter said reservoir, and said cup-shaped member being movable in the opposite direction to consecutively seat said first valve and unseat said second valve permitting discharge of liquid from said reservoir, means defining a power chamber between the outer wall of said cup-shaped member and the inner wall of said housing, seal means disposed between said cup-shaped member and said housing and arranged to prevent the passage of pressurized fluid from said power chamber to the interior of said cup-shaped member, an annular flange disposed in said power chamber and connected to said cup-shaped member, means for directing pressurized fluid to said power chamber on one side of said annular flange to urge said cup-shaped member in said one direction, and means for simultaneously releasing the pressurized fluid on said one side and directing pressurized fluid to said power chamber on the other side of said annular flange to urge said cup-shaped member in said opposite direction.

2. A liquid dispenser comprising a housing having a hollow interior affording a reservoir for liquid and having an opening in one wall, a member disposed across said opening having side walls in sliding sealing engagement with the inner walls of said housing and a bottom wall with a discharge port through which liquid may be discharged from said reservoir, a valve seat formed in said member around said discharge port, a valve arranged to engage said valve seat in liquid-tight engagement, said member being movable in one direction for moving said valve seat into engagement with said valve and movable in an opposite direction to unseat said valve, means defining a power chamber between the outer wall of said member and the inner wall of said housing, seal means disposed between said member and said housing and arranged to prevent the passage of pressurized fluid from said power chamber to the interior of said housing, an annular flange disposed in said power chamber and connected to said member, means for directing pressurized fluid to said power chamber on one side of said annular flange to urge said member in said one direction, and means for simultaneously releasing the pressurized fluid on said one side and directing pressurized fluid to said power chamber on the other side of said annular flange to urge said member in said opposite direction.

References Cited in the file of this patent

UNITED STATES PATENTS

| | | |
|---|---|---|
| 889,106 | Cunningham | May 26, 1908 |
| 2,035,898 | Kniskern | Mar. 31, 1936 |
| 2,152,870 | Cannon | Apr. 4, 1939 |
| 2,222,617 | Hothersall et al. | Nov. 26, 1946 |
| 2,522,898 | Sanborn | Sept. 19, 1950 |
| 2,575,964 | MacLean | Nov. 20, 1951 |